F. M. LEWIS.
DIFFERENTIAL MECHANISM.
APPLICATION FILED JUNE 4, 1914.
1,328,440.
Patented Jan. 20, 1920.
3 SHEETS—SHEET 1.
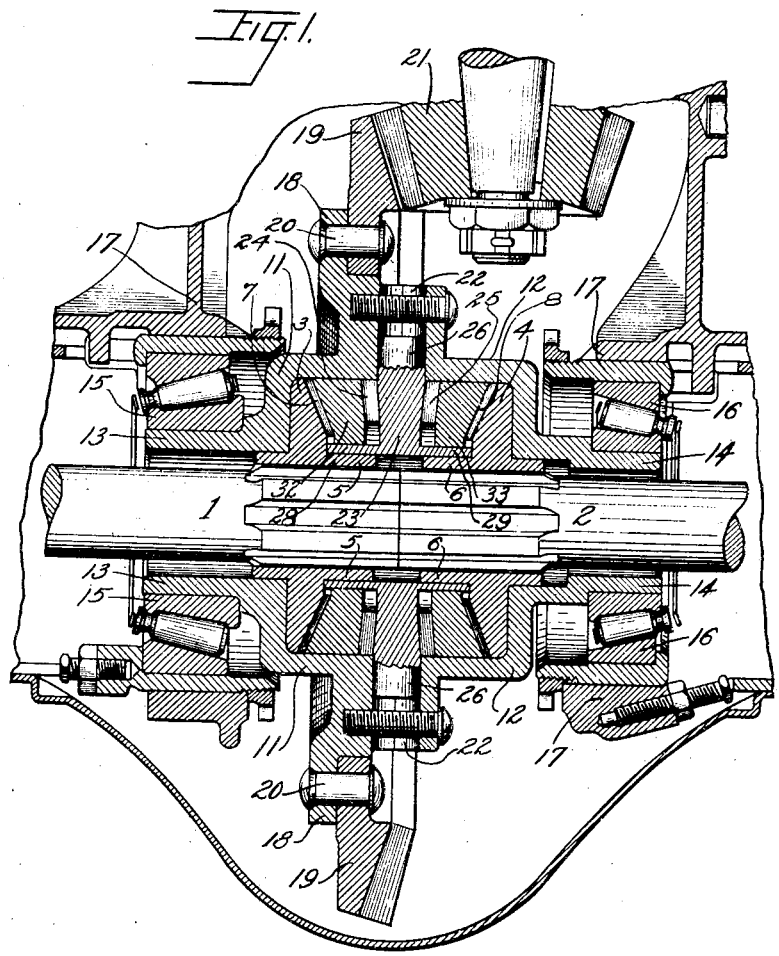
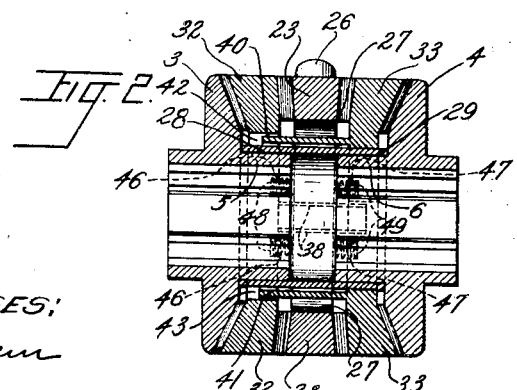
WITNESSES:
INVENTOR
Frank M. Lewis
BY Clarence W. Taylor
ATTORNEY

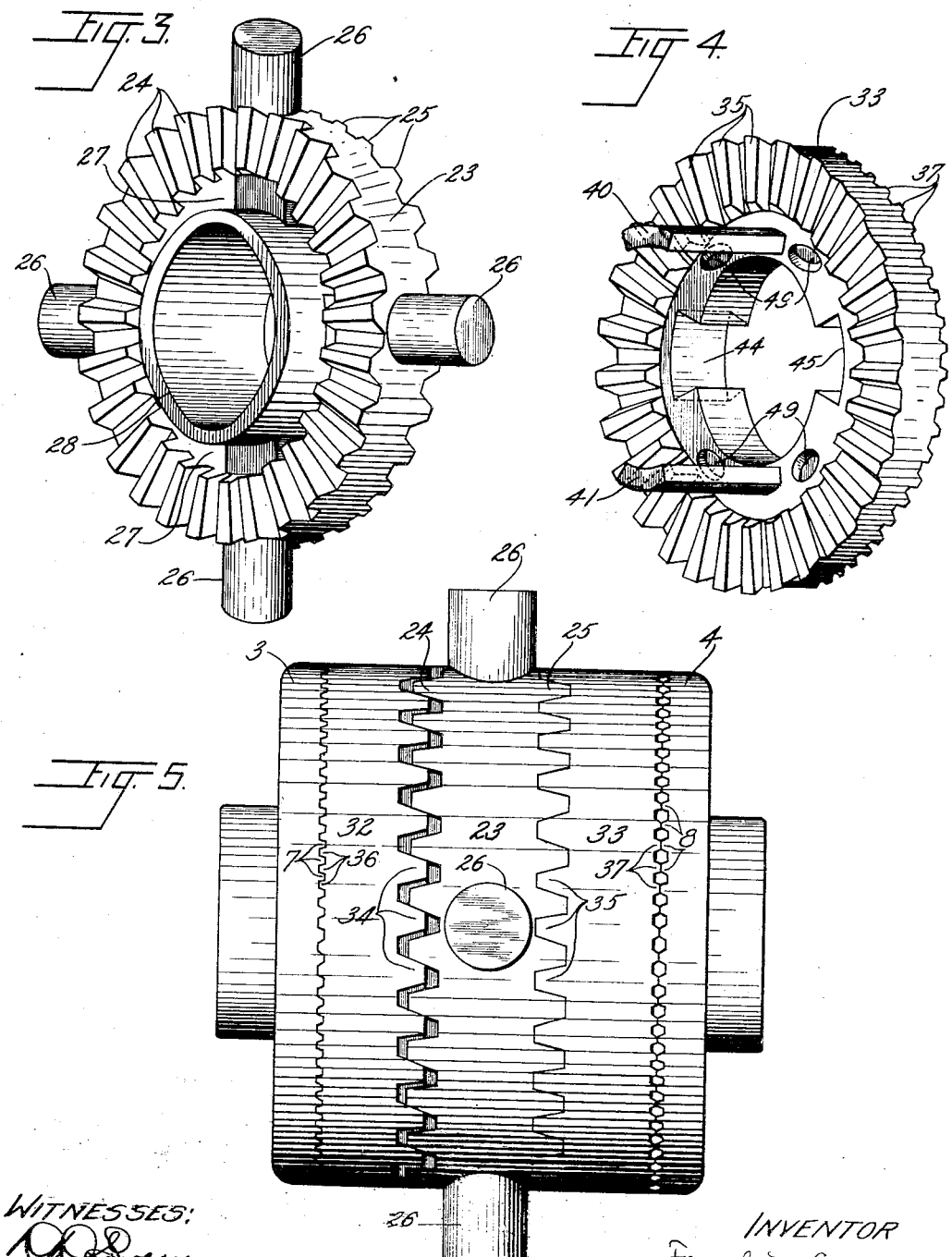

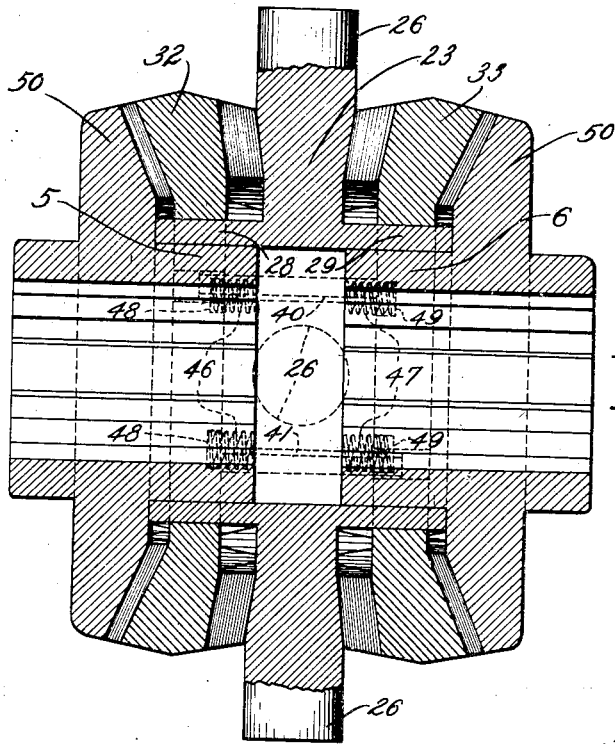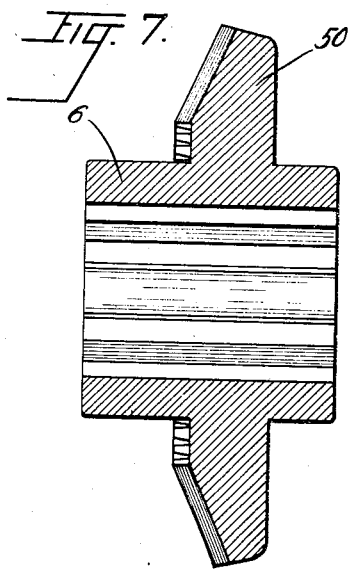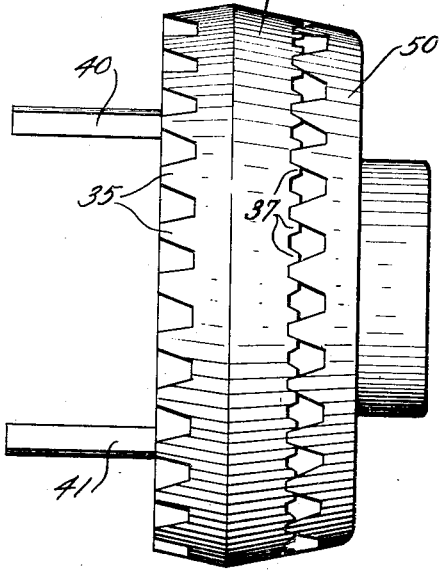

UNITED STATES PATENT OFFICE.

FRANK M. LEWIS, OF CHICAGO, ILLINOIS.

DIFFERENTIAL MECHANISM.

1,328,440. Specification of Letters Patent. Patented Jan. 20, 1920.

Application filed June 4, 1914. Serial No. 842,825.

*To all whom it may concern:*

Be it known that I, FRANK M. LEWIS, a citizen of the United States of America, residing at Chicago, in the county of Cook and State of Illinois, have invented certain new and useful Improvements in Differential Mechanism, of which the following is a specification.

My invention relates to improvements in differential mechanism, and the primary object of my improvement is to afford compensating means whereby to effect prompt, positive engagement and instant release between driving and driven parts, to actuate the driven parts in either direction, and to permit either driven part to independently disengage and revolve faster than the driving part, in either direction, particularly when employed in an automobile, a tractor or the like.

Another object of my present invention is to produce a device of the class having clutch members which may be shifted toward and from a driving part without manual effort, and be so constructed as to permit limited relative rotative movement of these shiftable clutch members independently of each other.

A further object of my improvement is to provide suitable means to yieldably oppose release of the shiftable clutch members from the respective driven parts.

With the foregoing and other objects in view, my invention consists in the novel features and in the novel combination and arrangement of parts hereinafter fully described, and particularly pointed out in the claims hereunto appended, it being understood that changes, variations and modifications in the details of the invention, within the scope of the claims, may be resorted to without departing from the spirit or sacrificing any of the advantages thereof.

Referring to the drawings:

Figure 1 is a horizontal central section of a part of a rear axle of an automobile.

Fig. 2 is a similar view of the mechanism detached from the shafts.

Fig. 3 is a perspective view of a driving part.

Fig. 4 is a perspective view of one of the shiftable clutch members.

Fig. 5 is a plan view of the mechanism detached from the shafts.

Fig. 6 is a horizontal section of a slightly modified form of the mechanism.

Fig. 7 is a section of a bevel gear wheel; and

Fig. 8 is a plan showing the engagement of a bevel gear with a shiftable clutch member.

The construction chosen to illustrate the invention is an automobile with my invention in operative relation with the inner or opposing ends of a divided shaft.

Similar reference numerals indicate similar parts throughout the several views of the drawings.

The inner ends of the independent shafts 1, 2, have suitably fixed thereto driven parts 3, 4, respectively, with inwardly extending hubs 5, 6, and provided with relatively small clutch teeth 7, 8.

A rotatable housing composed of parts 11, 12, are suitably secured together and having outwardly projecting hubs 13, 14, respectively, supported against bearings 15, 16, carried by the non-rotatable housing 17. The part 11 has an external annular flange 18, to which the master bevel gear wheel 19 is fixed by rivets 20 and is in mesh with the bevel pinion 21 on the engine shaft (not shown).

For the purpose of installing my improvement in automobiles in use, instead of the bevel gear type of differential mechanism with which cars are commonly equipped, preferably I employ the usual stud holes 22 formed in the housing made up of the parts 11, 12.

What I term a driving part 23 is formed by drop forging, or other preferred method, with clutch teeth 24, 25 of comparatively large size and on both sides thereof the working faces of the teeth being of the same angle. The radially projecting studs 26 are adapted to be disposed in the stud holes 22. The openings 27 through the driving part 23 are of suitable dimensions to afford a free path of travel of the bars 38, 39, 40, 41, hereinafter mentioned.

The lateral annular flanges 28, 29, serve as means to keep in alinement shiftable clutch members 32, 33, when being moved toward and from the driving part 23, in constructions where necessary or desirable. Obviously the flanges may be omitted and the axial openings through the clutch members 32, 33, may be of less diameter and the hubs 5, 6, may be employed for the same purpose as the flanges 28, 29.

The clutch teeth 34, 35 are in mesh with the teeth 24, 25, of the driving part 23.

The relatively smaller teeth 36, 37 of the shiftable clutch members 32, 33, are capable of intermeshing with the teeth 7, 8, of the driven parts 34.

The laterally projecting bars 38, 39, 40, 41, integral with or attached to the respective shiftable clutch members 32, 33, are for the principal purpose of permitting and limiting relative rotative movement of the clutch members 32, 33. The recesses 42, 43, formed in the clutch member 32, and 44, 45, formed in the clutch members 33, are of a sufficient depth and width to allow the members 32, 33, to be moved toward and from the driving part 23, independently of each other, as well as to permit a sufficient independent relative rotative movement of the clutch members 32, 33, to release either driven part when compensating movement is made necessary by reason of the increased speed of either vehicle wheel, as, for example, when turning a corner. Both clutch members 32, 33, are alike and a description of one is a description of both.

I do not limit my invention to the exact means shown and described for permitting and limiting relative rotative movement of the shiftable clutch members, nor of providing relative longitudinal movement of such members independently of each other.

The coil springs 46, 47, are seated in recesses 48, 49, in the opposing faces of the shiftable clutch members and serve to yieldably oppose longitudinal movement of the clutch members and constantly urge them into operative engagement with the respective driven parts.

In Figs. 6, 7 and 8, I have shown a slight modification consisting in the employment of the usual bevel gear 50 in the place of the small toothed parts 3, 4.

The cam action of the clutch teeth 24, 25, against the clutch teeth 34, 35, results in a wedging action and thus the driving part 23 locks the clutch members 32, 33, against release from engagement with the driven parts 3, 4, until the speed of one driven part is increased by the road power of that particular vehicle wheel, when its shiftable clutch member may be moved toward the driving part by any power that will overcome the tension of the springs opposing its movement. The road power is always sufficient to overcome the tension of the springs.

One purpose of the lesser clutch teeth on the driven parts and the adjacent faces of the shiftable clutch members is to give slight degrees of compensating movement made necessary by uneven portions of the road surface.

In operation, when power is applied to the rotatable housing, and thus to the driving part 23, the first effect is to force the shiftable clutch members 32, 33, outwardly into positive engagement with the driven parts 3, 4, if not already forced into such position by the tension of the respective springs. In this position of a two-wheel positive drive they continue, excepting at such time or times when either vehicle wheel is caused to run faster than the other vehicle wheel. The extent of relative rotative movement of either shiftable clutch is half of the distance between what I term "a back up and go ahead" of the vehicle, which is only slight, as the construction is one to minimize lost motion.

The interlocking of the two shiftable clutch members by the bars 38, 39, 40, 41, with the free ends disposed in recesses, as shown, renders impossible greater relative movement of either clutch member than is required to bring the disengaging clutch member to a position of unimpeded movement toward and from the driving part.

Having thus fully described my invention, what I claim as new, and desire to secure by Letters Patent, is:

1. In a differential mechanism, in combination, a pair of alined axle sections, a driving member having a hub encircling the meeting ends of said axle sections and major clutch teeth on both sides, shiftable clutch members mounted on the opposite end portions of said hub and having major clutch teeth on one side in mesh with the teeth of the driving member, each shiftable clutch member having minor clutch teeth on one side thereof, means carried by the respective shiftable clutch members to permit and to limit relative rotative movement of the shiftable clutch members and to allow said members to move toward and from the driving member, and driven members keyed to said axle sections and each formed with minor clutch teeth on one side for operative engagement with the minor clutch teeth of the respective shiftable clutch members.

2. In a differential mechanism, in combination, a pair of alined axle sections, driven members keyed to said axle sections and formed with inwardly extending hub portions and with minor clutch teeth on their opposed faces, a driving member having a hub mounted on the inwardly extending hub portions of said driven member and major clutch teeth on both sides, shiftable clutch members mounted on the opposite end portions of the hub of said driving member and having major clutch teeth on one side in mesh with the teeth of the driving member and minor clutch teeth engagable with the minor clutch teeth of said driven members, and means carried by the respective shiftable clutch members to permit and to limit relative rotative movement of the shiftable clutch members and to allow said members to move toward and from the driving member.

In testimony whereof I affix my signature in presence of two witnesses.

FRANK M. LEWIS.

Witnesses:
    SCOTT M. HOGAN,
    C. RICHARD BETTS.